US012638886B2

(12) United States Patent
Son et al.

(10) Patent No.: US 12,638,886 B2
(45) Date of Patent: May 26, 2026

(54) RESIN COMPOSITION, DISPLAY APPARATUS INCLUDING THE RESIN COMPOSITION, AND PORTABLE ELECTRONIC DEVICE INCLUDING THE RESIN COMPOSITION

(71) Applicants: Samsung Display Co., LTD., Yongin-si (KR); Dongjin Semichem Co., Ltd., Hwaseong-si (KR)

(72) Inventors: Younghye Son, Yongin-si (KR); Yongwoo Kim, Seoul (KR); Onnuri Kim, Yongin-si (KR); Jinwuk Kim, Goyang-si (KR); Junyong Song, Suwon-si (KR); Sanggu Lee, Yongin-si (KR)

(73) Assignees: Samsung Display Co., Ltd., Yongin-si (KR); Dongjin Semichem Co., Ltd., Hwaseong-si (KR)

( * ) Notice: Subject to any disclaimer, the term of this patent is extended or adjusted under 35 U.S.C. 154(b) by 155 days.

(21) Appl. No.: 18/596,527

(22) Filed: Mar. 5, 2024

(65) Prior Publication Data

US 2024/0319769 A1    Sep. 26, 2024

(30) Foreign Application Priority Data

Mar. 24, 2023 (KR) .......................... 10-2023-0039078
Jun. 21, 2023 (KR) .......................... 10-2023-0079937

(51) Int. Cl.
*G06F 1/16* (2006.01)
*C08F 20/06* (2006.01)
(Continued)

(52) U.S. Cl.
CPC ............ *G06F 1/1652* (2013.01); *C08F 20/06* (2013.01); *C08F 20/36* (2013.01); *C08F 20/56* (2013.01);
(Continued)

(58) Field of Classification Search
None
See application file for complete search history.

(56) References Cited

U.S. PATENT DOCUMENTS 10,892,443 B2    1/2021   Ahn et al.
2019/0115547 A1*  4/2019   Lee .......................... B32B 27/32
(Continued)

FOREIGN PATENT DOCUMENTS

KR    10-2020-0072643 A    6/2020
KR    10-2021-0137255 A    11/2021
(Continued)

*Primary Examiner* — Ramsey Zacharia
(74) *Attorney, Agent, or Firm* — Womble Bond Dickinson (US) LLP

(57) ABSTRACT

Provided is a display apparatus including a display panel having a display element therein, a cover window on the display panel, and an adhesive member between the display panel and the cover window and including a first adhesive layer and a second adhesive layer on the first adhesive layer, wherein the second adhesive layer includes a resin composition including an acrylamide-based compound, an ester-based compound, an acrylate-based compound, and an initiator, the ester-based compound including a first ester-based compound and a second ester-based compound, the first ester-based compound including a heterocycloalkyl group, and the second ester-based compound including an aryl group, and the acrylate-based compound including a urethane acrylate-based compound, a first acrylate-based compound, and a second acrylate-based compound, the first acrylate-based compound including a bicyclic compound, and the second acrylate-based compound including a linear alkyl group.

14 Claims, 5 Drawing Sheets

(51) Int. Cl.

| | |
|---|---|
| *C08F 20/36* | (2006.01) |
| *C08F 20/56* | (2006.01) |
| *C08K 5/101* | (2006.01) |
| *C08K 5/1575* | (2006.01) |
| *C08K 5/5313* | (2006.01) |
| *C09J 133/08* | (2006.01) |
| *C09J 133/14* | (2006.01) |
| *C09J 133/26* | (2006.01) |

(52) U.S. Cl.
CPC ............ *C08K 5/101* (2013.01); *C08K 5/1575* (2013.01); *C08K 5/5313* (2013.01); *C09J 133/08* (2013.01); *C09J 133/14* (2013.01); *C09J 133/26* (2013.01)

(56) References Cited

U.S. PATENT DOCUMENTS

| | | | |
|---|---|---|---|
| 2022/0154050 A1 | 5/2022 | Kim et al. | |
| 2022/0242984 A1 | 8/2022 | Kim et al. | |
| 2023/0180588 A1 | 6/2023 | Choi et al. | |

FOREIGN PATENT DOCUMENTS

| | | | | |
|---|---|---|---|---|
| KR | 10-2022-0011478 A | 1/2022 | | |
| KR | 10-2022-0065947 A | 5/2022 | | |
| KR | 10-2022-0108288 A | 8/2022 | | |
| WO | WO-2024052248 A1 * | 3/2024 | .............. | C09J 7/385 |

* cited by examiner

RESIN COMPOSITION, DISPLAY APPARATUS INCLUDING THE RESIN COMPOSITION, AND PORTABLE ELECTRONIC DEVICE INCLUDING THE RESIN COMPOSITION

CROSS-REFERENCE TO RELATED APPLICATIONS

The present application is based on and claims priority to Korean Patent Application No. 10-2023-0039078, filed on Mar. 24, 2023, and Korean Patent Application No. 10-2023-0079937, filed on Jun. 21, 2023, in the Korean Intellectual Property Office, the entire contents of each of which are herein incorporated by reference.

BACKGROUND

1. Field

One or more embodiments of the present disclosure relate to a resin composition and a display apparatus including the same, and, for example, to a resin composition having improved cleanability to ethanol and a display apparatus including the resin composition.

2. Description of Related Art

Recently, the usage of display apparatuses has diversified. In addition, as display apparatuses have become thinner and lighter, their range of use has expanded. As the range of use of display apparatuses has diversified, various suitable methods of designing the shape of a display apparatus have been researched.

In a display apparatus, a cover window for protecting lower structures is on a display panel, and an adhesive layer including an optically clear resin (OCR) is used to bond the display panel to the cover window.

SUMMARY

According to one or more embodiments of the present disclosure, a display apparatus includes a display panel having a display element therein, a cover window on the display panel, and an adhesive member between the display panel and the cover window and including a first adhesive layer and a second adhesive layer on the first adhesive layer, wherein the second adhesive layer includes a resin composition including an acrylamide-based compound, an ester-based compound, an acrylate-based compound, and an initiator, the ester-based compound including a first ester-based compound and a second ester-based compound, the first ester-based compound including a heterocycloalkyl group, and the second ester-based compound including an aryl group, and the acrylate-based compound including a urethane acrylate-based compound, a first acrylate-based compound, and a second acrylate-based compound, the first acrylate-based compound including a bicyclic compound, and the second acrylate-based compound including a linear alkyl group.

In an embodiment, the acrylamide-based compound may be included at a weight ratio in a range of about 20 wt % to about 30 wt % with respect to the resin composition, the first ester-based compound may be included at a weight ratio in a range of about 15 wt % to about 25 wt % with respect to the resin composition, the second ester-based compound may be included at a weight ratio in a range of about 25 wt % to about 35 wt % with respect to the resin composition, the urethane acrylate-based compound may be included at a weight ratio in a range of about 10 wt % to about 20 wt % with respect to the resin composition, the first acrylate-based compound may be included at a weight ratio in a range of about 10 wt % to about 20 wt % with respect to the resin composition, the second acrylate-based compound may be included at a weight ratio in a range of about 5 wt % to about 15 wt % with respect to the resin composition, and the initiator may be included at a weight ratio in a range of about 0.01 wt % to about 5 wt % with respect to the resin composition.

In an embodiment, the second adhesive layer may further include a non-silicone-based surfactant.

In an embodiment, a Young's modulus of the first adhesive layer may be less than a Young's modulus of the second adhesive layer.

In an embodiment, the first acrylate-based compound may include a bridged bicyclic compound.

In an embodiment, the acrylamide-based compound may include N,N-dimethylacrylamide.

In an embodiment, the first ester-based compound may include 2-propenoic acid, (5-ethyl-1,3-dioxan-5-yl)methyl ester.

In an embodiment, the second ester-based compound may include 2-propenoic acid, 2-phenoxyethyl ester.

In an embodiment, the first acrylate-based compound may include exo-1,7,7-trimethylbicyclo[2.2.1]hept-2-yl acrylate.

In an embodiment, the second acrylate-based compound may include isooctyl acrylate.

In an embodiment, the initiator may include a phosphorus-based compound.

In an embodiment, the initiator may include ethyl phenyl (2,4,6-trimethylbenzoyl)phosphinate.

In an embodiment, the first adhesive layer may include optically clear resin (OCR).

In an embodiment, a thickness of the second adhesive layer may be less than or equal to a thickness of the first adhesive layer.

According to one or more embodiments, a portable electronic device includes a foldable display panel including a first display area and a second display area, a cover window on the foldable display panel, and an adhesive member between the foldable display panel and the cover window and including a first adhesive layer and a second adhesive layer on the first adhesive layer, wherein the second adhesive layer includes a resin composition including an acrylamide-based compound, an ester-based compound, an acrylate-based compound, and an initiator, the ester-based compound including a first ester-based compound and a second ester-based compound, the first ester-based compound including a heterocycloalkyl group, and the second ester-based compound including an aryl group, and the acrylate-based compound including a urethane acrylate-based compound, a first acrylate-based compound, and a second acrylate-based compound, the first acrylate-based compound including a bicyclic compound, and the second acrylate-based compound including a linear alkyl group.

In an embodiment, a thickness of the second adhesive layer may be less than or equal to a thickness of the first adhesive layer.

According to one or more embodiments, a resin composition includes an acrylamide-based compound, a first ester-based compound including a heterocycloalkyl group, a second ester-based compound including an aryl group, a urethane acrylate-based compound, a first acrylate-based compound including a bicyclic compound, a second acrylate-based compound including a linear alkyl group, and an initiator.

In an embodiment, the acrylamide-based compound may be included at a weight ratio in a range of about 20 wt % to about 30 wt % with respect to the resin composition, the first ester-based compound may be included at a weight ratio in a range of about 15 wt % to about 25 wt % with respect to the resin composition, the second ester-based compound may be included at a weight ratio in a range of about 25 wt % to about 35 wt % with respect to the resin composition, the urethane acrylate-based compound may be included at a weight ratio in a range of about 10 wt % to about 20 wt % with respect to the resin composition, the first acrylate-based compound may be included at a weight ratio in a range of about 10 wt % to about 20 wt % with respect to the resin composition, the second acrylate-based compound may be included at a weight ratio in a range of about 5 wt % to about 15 wt % with respect to the resin composition, and the initiator may be included at a weight ratio in a range of about 0.01 wt % to about 5 wt % with respect to the resin composition.

In an embodiment, the first ester-based compound may include 2-propenoic acid, (5-ethyl-1,3-dioxan-5-yl)methyl ester.

In an embodiment, the second ester-based compound may include 2-propenoic acid, 2-phenoxyethyl ester.

In an embodiment, the first acrylate-based compound may include exo-1,7,7-trimethylbicyclo[2.2.1]hept-2-yl acrylate.

In an embodiment, the second acrylate-based compound may include isooctyl acrylate.

Additional aspects of embodiments will be set forth in part in the description which follows and, in part, will be apparent from the description, or may be learned by practice of the presented embodiments of the disclosure.

BRIEF DESCRIPTION OF THE DRAWINGS

The above and other aspects and features of certain embodiments of the disclosure will be more apparent from the following description taken in conjunction with the accompanying drawings, in which.

DETAILED DESCRIPTION

Figure 1:
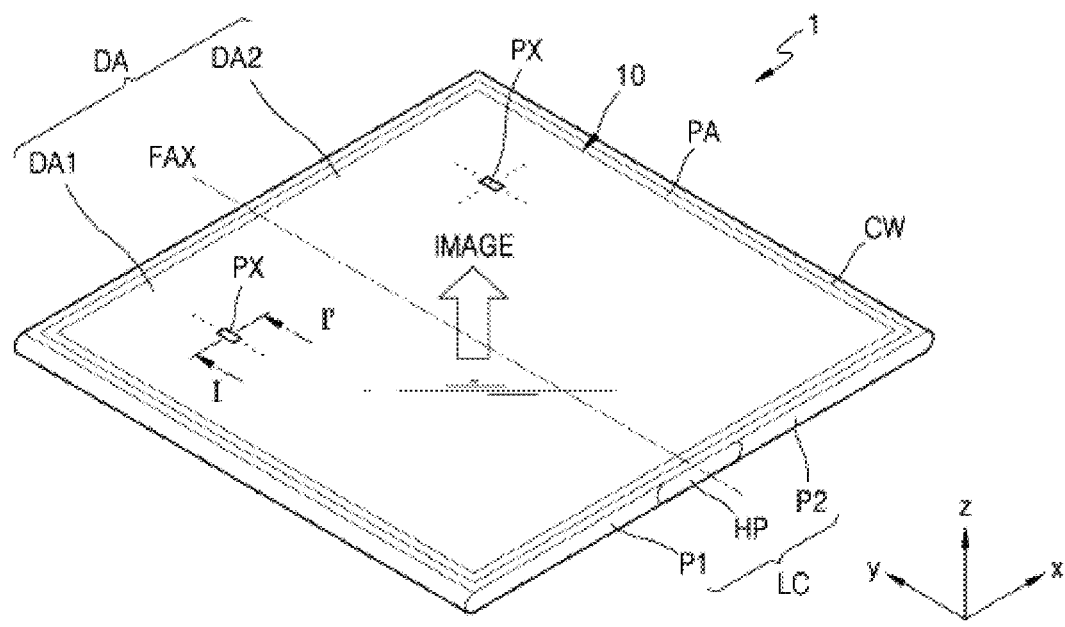
FIGS. 1-2 are schematic perspective views of a display apparatus according to an embodiment.

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of embodiments of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, certain embodiments will be illustrated in the drawings and described in the written description. Effects and features of the subject matter of the disclosure, and methods for achieving them will be clarified with reference to embodiments described below in more detail with reference to the drawings. However, the subject matter of the disclosure is not limited to the following embodiments and may be embodied in various forms.

Hereinafter, embodiments of the disclosure will be described in more detail with reference to the accompanying drawings. When describing embodiments with reference to the drawings, the same or corresponding elements are denoted by the same reference numerals, and redundant descriptions thereof may not be repeated.

In the following embodiments, while terms such as "first" and "second" are used to describe various elements, these elements are not limited by these terms. These terms are only used to distinguish one element from another element.

In the following embodiments, an expression used in the singular encompasses the expression of the plural, unless it has a clearly different meaning in the context.

In the following embodiments, terms such as "comprise," "include," and "have" are used to specify the presence of stated features or elements, but do not preclude the addition of one or more other features or elements.

In the following embodiments, when a layer, region, or element is referred to as being "on" another layer, region, or element, it can be directly or indirectly on the other layer, region, or element. For example, intervening layers, regions, or elements may be present.

Sizes of elements in the drawings may be exaggerated or reduced for convenience of description. For example, because sizes and thicknesses of elements in the drawings may be arbitrarily illustrated for convenience of description, the disclosure is not limited thereto.

In the following embodiments, the x-axis, the y-axis, and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When an embodiment may be implemented differently, a certain process order may be performed differently from the described order. For example, two processes described in succession may be performed concurrently (e.g., substantially simultaneously or simultaneously), or may be performed in an order opposite to the order described.

Figure 2:
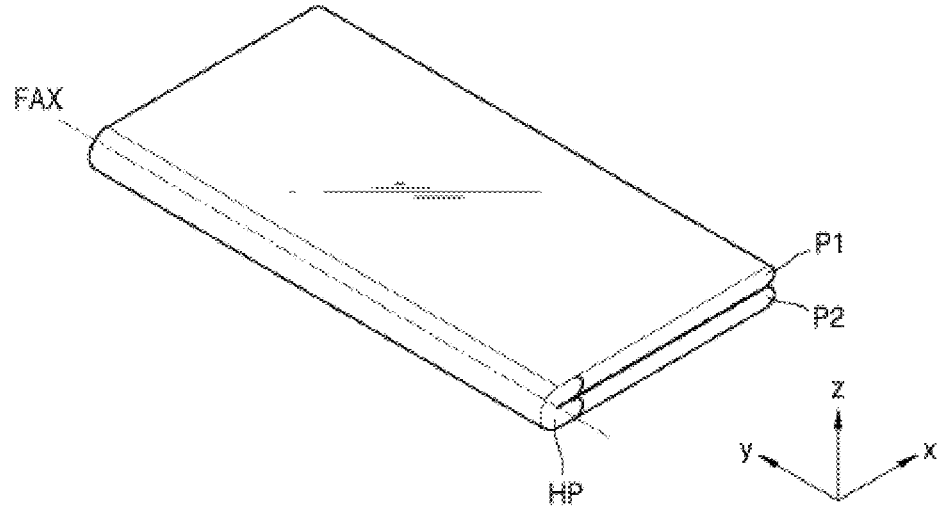

FIGS. 1-2 are schematic perspective views of a display apparatus 1 according to an embodiment. In more detail, FIG. 1 shows a state in which the display apparatus 1 is unfolded, and FIG. 2 shows a state in which the display apparatus 1 is folded.

Referring to FIGS. 1-2, the display apparatus 1 is an apparatus for displaying moving images and/or still images, and may be used as a display screen of various suitable products, such as a television, a laptop computer, a monitor, a billboard, and/or an Internet of Things (IOT) device, as well as portable electronic devices, such as a mobile phone, a smartphone, a tablet personal computer (PC), a mobile communication terminal, an electronic notebook, an electronic book, a portable multimedia player (PMP), a navigation device, and/or an ultra-mobile PC (UMPC). In some embodiments, the display apparatus 1 according to an embodiment may be used in a wearable device, such as a smart watch, a watch phone, a glasses-type display, and/or a head-mounted display (HMD). In some embodiments, the display apparatus 1 according to an embodiment may be used as a vehicle instrument panel, a center information display (CID) on a center fascia or dashboard of a vehicle, a mirror display that replaces a mirror (e.g., a side mirror) of a vehicle, and/or a display on a rear surface of a front seat as an entertainment device for a back seat of a vehicle.

As shown in FIG. 1, the display apparatus 1 may have a substantially rectangular shape. For example, as shown in FIG. 1, the display apparatus 1 may have an overall rectangular planar shape having a short side extending in a first direction (e.g., an x direction or a −x direction) and a long side extending in a second direction (e.g., a y direction or a −y direction). In an embodiment, a portion in which the short side extending in the first direction (e.g., the x direction or the −x direction) and the long side extending in the second direction (e.g., the y direction or the −y direction) meet may have a right-angled shape or a round shape having a set or certain curvature. However, the planar shape of the display apparatus 1 is not limited to a rectangle, and the display apparatus 1 may have a polygonal, circular, or elliptical shape.

The display apparatus 1 may include a lower cover LC, a display panel 10, and a cover window CW.

The lower cover LC may form the exterior of a lower surface of the display apparatus 1. The lower cover LC may include plastic, metal, or both plastic and metal. The lower cover LC may include a first portion P1 and a second portion P2 that support the display panel 10. The lower cover LC may be folded around a folding axis FAX defined between the first portion P1 and the second portion P2. In an embodiment, the lower cover LC may further include a hinge portion HP, and the hinge portion HP may be provided between the first portion P1 and the second portion P2.

The display panel 10 may include a display area DA and a peripheral area PA. The display area DA may display an image. In some embodiments, pixels PX may be in the display area DA. The display panel 10 may provide an image by using light emitted from the pixels PX. Each of the pixels PX may emit light by using a display element. In an embodiment, each of the pixels PX may emit red, green, or blue light. In an embodiment, each of the pixels PX may emit red, green, blue, or white light.

The peripheral area PA is an area that does not provide an image (or is not designed to provide an image), and may be a non-display area. The peripheral area PA may at least partially surround the display area DA. For example, the peripheral area PA may entirely surround the display area DA. A driver for providing electrical signals to the pixels PX, a power wiring for providing power to the pixels PX, and/or the like may be in the peripheral area PA. For example, a scan driver for applying scan signals to the pixels PX may be in the peripheral area PA. In some embodiments, a data driver for applying data signals to the pixels PX may be in the peripheral area PA.

The display area DA may include a first display area DA1 and a second display area DA2 at both sides of the folding axis FAX crossing the display area DA. The first display area DA1 and the second display area DA2 may be respectively on the first portion P1 and the second portion P2 of the lower cover LC. The display panel 10 may provide a first image and a second image by using light emitted from a plurality of pixels PX in the first display area DA1 and the second display area DA2, respectively. In an embodiment, the first image and the second image may be portions of any one image provided via the display area DA of the display panel 10. In some embodiments, the display panel 10 may provide a first image and a second image independent of each other.

The display panel 10 may be folded around the folding axis FAX. In an embodiment, the display panel 10 may be a foldable display panel. In an embodiment, when the display panel 10 is folded, the first display area DA1 and the second display area DA2 of the display panel 10 may face each other. In another embodiment, when the display panel 10 is folded, the first display area DA1 and the second display area DA2 of the display panel 10 may face opposite directions.

In some embodiments, the display panel 10 may be in-folded or out-folded with respect to the folding axis FAX. In some embodiments, in-folding may mean that the display panel 10 is folded in a +z direction with respect to the folding axis FAX, and out-folding may mean that the display panel 10 is folded in a −z direction with respect to the folding axis FAX. In some embodiments, in-folding may mean that an upper surface of the cover window CW on the display panel 10 is folded such that portions thereof face each other, and out-folding may mean that a lower surface of the cover window CW is folded such that portions thereof face each other. In some embodiments, the lower surface of the cover window CW may refer to a surface that is closer to a substrate 100 (see FIG. 3) in the z direction than the upper surface of the cover window CW.

Although FIGS. 1-2 show an embodiment in which the folding axis FAX extends in the second direction (the y direction), the disclosure is not limited thereto. In an embodiment, the folding axis FAX may extend in the first direction (the x direction) crossing the second direction (the y direction). In some embodiments, on an xy plane, the folding axis FAX may extend in a direction crossing the first direction (the x direction) and the second direction (the y direction).

In some embodiments, although FIGS. 1-2 show an embodiment in which one folding axis FAX is provided, the disclosure is not limited thereto. In an embodiment, the display panel 10 may be folded with respect to two folding axes FAX crossing the display area DA. For example, when the display panel 10 is folded with respect to two folding axes FAX, the display panel 10 may be in-folded with respect to one folding axis FAX and out-folded with respect to the other folding axis FAX. In some embodiments, the display panel 10 may be in-folded or out-folded with respect to both of two folding axes FAX. In an embodiment, the display panel 10 may be folded with respect to a plurality of folding axes FAX crossing the display area DA. In some embodiments, the display panel 10 may be in-folded or out-folded with respect to each folding axis FAX.

The cover window CW may be on the display panel 10 and cover the display panel 10. The cover window CW may be folded and/or bent according to an external force without generating cracks and/or the like. When the display panel 10 is folded around the folding axis FAX, the cover window CW may also be folded and cover the display panel 10.

Figure 3:
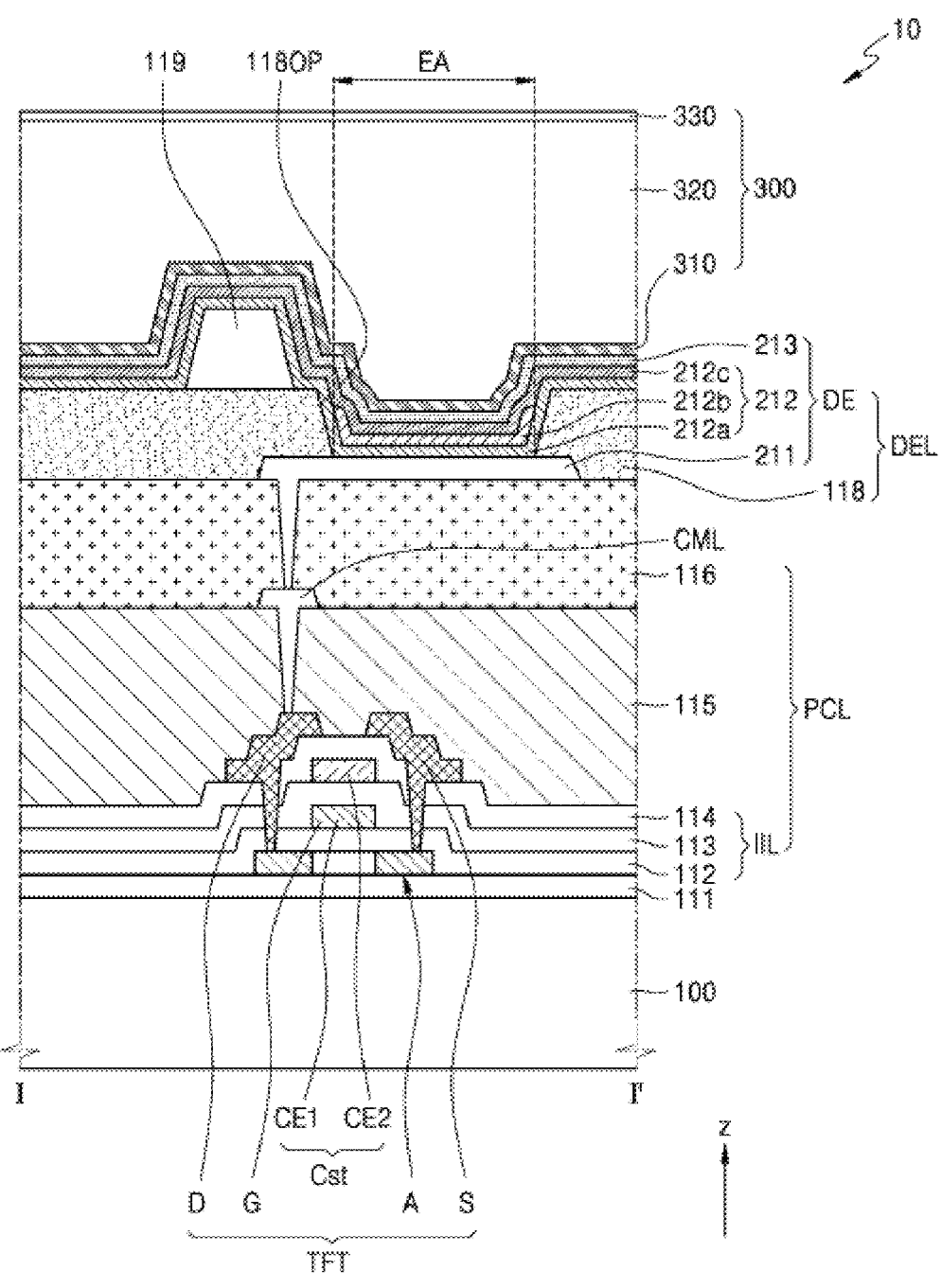
FIG. 3 is a schematic cross-sectional view taken along line I-I' of FIG. 1 and showing a display panel according to an embodiment.

FIG. 3 is a schematic cross-sectional view taken along line I-I' of FIG. 1 and show the display panel 10 according to an embodiment.

Referring to FIG. 3, the display panel 10 may include the substrate 100, a buffer layer 111, a pixel circuit layer PCL, a display element layer DEL, and an encapsulation layer 300.

The substrate 100 may include glass and/or polymer resin, such as polyethersulfone, polyarylate, polyetherimide, polyethylene naphthalate, polyethylene terephthalate (PET), polyphenylene sulfide, polyimide, polycarbonate, cellulose triacetate, and/or cellulose acetate propionate. In an embodiment, the substrate 100 may have a multi-layered structure including a base layer including the above-described polymer resin, and a barrier layer. The substrate 100 including the polymer resin may be flexible, rollable, and/or bendable.

The buffer layer 111 may be on the substrate 100. The buffer layer 111 may include an inorganic insulating material, such as silicon nitride ($SiN_x$), silicon oxynitride (SiON), and/or silicon oxide ($SiO_2$), and may be a single layer or a multi-layer including the above-described inorganic insulating material.

The pixel circuit layer PCL may be on the buffer layer 111. The pixel circuit layer PCL may include a thin-film transistor TFT, which is included in a pixel circuit, and an inorganic insulating layer IIL, a first planarization layer 115, and a second planarization layer 116, which are below or/and above components of the thin-film transistor TFT. The inorganic insulating layer IIL may include a first gate insulating layer 112, a second gate insulating layer 113, and an interlayer insulating layer 114.

The thin-film transistor TFT may include a semiconductor layer A, and the semiconductor layer A may include polysilicon. In some embodiments, the semiconductor layer A may include amorphous silicon, an oxide semiconductor, an organic semiconductor, and/or the like. The semiconductor layer A may include a channel area, and a drain area and a source area respectively at both sides of the channel area. A gate electrode G may overlap the channel area.

The gate electrode G may include a low-resistance metal material. The gate electrode G may include a conductive material (e.g., an electrically conductive material) including molybdenum (Mo), aluminum (Al), copper (Cu), titanium (Ti), and/or the like, and may be formed as a multi-layer or a single layer including the above-described material.

The first gate insulating layer 112 between the semiconductor layer A and the gate electrode G may include an inorganic insulating material, such as $SiO_2$, $SiN_x$, SiON, aluminum oxide ($Al_2O_3$), titanium oxide ($TiO_2$), tantalum oxide ($Ta_2O_5$), hafnium oxide ($HfO_2$), and/or zinc oxide ($ZnO_x$). $ZnO_x$ may be zinc oxide (ZnO) and/or zinc peroxide ($ZnO_2$).

The second gate insulating layer 113 may cover the gate electrode G. Like the first gate insulating layer 112, the second gate insulating layer 113 may include an inorganic insulating material, such as $SiO_2$, $SiN_x$, SiON, $Al_2O_3$, $TiO_2$, $Ta_2O_5$, $HfO_2$, and/or $ZnO_x$. $ZnO_x$ may be ZnO and/or $ZnO_2$.

An upper electrode CE2 of a storage capacitor Cst may be on the second gate insulating layer 113. The upper electrode CE2 may overlap the gate electrode G therebelow. In some embodiments, the gate electrode G and the upper electrode CE2 overlapping each other with the second gate insulating layer 113 therebetween may form the storage capacitor Cst of a pixel circuit. In some embodiments, the gate electrode G may function as a lower electrode CE1 of the storage capacitor Cst. As such, the storage capacitor Cst and the thin-film transistor TFT may overlap each other. In some embodiments, the storage capacitor Cst may not overlap the thin-film transistor TFT.

The upper electrode CE2 may include Al, platinum (Pt), palladium (Pd), silver (Ag), magnesium (Mg), gold (Au), nickel (Ni), neodymium (Nd), iridium (Ir), chromium (Cr), calcium (Ca), Mo, Ti, tungsten (W), and/or Cu, and may be a single layer or a multi-layer including the above-described material.

The interlayer insulating layer 114 may cover the upper electrode CE2. The interlayer insulating layer 114 may include $SiO_2$, $SiN_x$, SiON, $Al_2O_3$, $TiO_2$, $Ta_2O_5$, $HfO_2$, $ZnO_x$, and/or the like. $ZnO_x$ may be ZnO and/or $ZnO_2$. The interlayer insulating layer 114 may be a single layer or a multi-layer including the above-described inorganic insulating material.

A drain electrode D and a source electrode S may each be on the interlayer insulating layer 114. The drain electrode D and the source electrode S may each include a material having high conductivity (e.g., high electrical conductivity). The drain electrode D and the source electrode S may each include a conductive material (e.g., an electrically conductive material) including Mo, Al, Cu, Ti, and/or the like, and may be formed as a multi-layer or a single layer including the above-described material. In an embodiment, the drain electrode D and the source electrode S may each have a multi-layered structure of Ti/Al/Ti.

The first planarization layer 115 may cover the drain electrode D and the source electrode S. The first planarization layer 115 may include an organic insulating layer. The first planarization layer 115 may include an organic insulating material including a general-purpose polymer, such as polymethyl methacrylate (PMMA) and/or polystyrene (PS), a polymer derivative having a phenolic group, an acrylic polymer, an imide-based polymer, an aryl ether-based polymer, an amide-based polymer, a fluorine-based polymer, a p-xylene-based polymer, a vinyl alcohol-based polymer, and/or a blend thereof.

A connection electrode CML may be on the first planarization layer 115. In some embodiments, the connection electrode CML may be connected to the drain electrode D or the source electrode S via a contact hole of the first planarization layer 115. The connection electrode CML may include a material having high conductivity (e.g., high electrical conductivity). The connection electrode CML may include a conductive material (e.g., an electrically conductive material) including Mo, Al, Cu, Ti, and/or the like, and may be formed as a multi-layer or a single layer including the above-described material. In an embodiment, the connection electrode CML may have a multi-layered structure of Ti/Al/Ti.

The second planarization layer 116 may cover the connection electrode CML. The second planarization layer 116 may include an organic insulating layer. The second planarization layer 116 may include an organic insulating material including a general-purpose polymer, such as PMMA and/or PS, a polymer derivative having a phenolic group, an acrylic polymer, an imide-based polymer, an aryl ether-based polymer, an amide-based polymer, a fluorine-based polymer, a p-xylene-based polymer, a vinyl alcohol-based polymer, and/or a blend thereof.

The display element layer DEL may be on the pixel circuit layer PCL. The display element layer DEL may include a display element DE. The display element DE may be an organic light-emitting diode (OLED). A pixel electrode 211 of the display element DE may be electrically connected to the connection electrode CML via a contact hole of the second planarization layer 116.

The pixel electrode 211 may include a conductive oxide (e.g., an electrically conductive oxide), such as indium tin oxide (ITO), indium zinc oxide (IZO), ZnO, indium oxide ($In_2O_3$), indium gallium oxide (IGO), and/or aluminum zinc oxide (AZO). In another embodiment, the pixel electrode 211 may include a reflective layer including Ag, Mg, Al, Pt, Pd, Au, Ni, Nd, Ir, Cr, and/or a compound thereof. In another embodiment, the pixel electrode 211 may further include a layer including ITO, IZO, ZnO, and/or $In_2O_3$ above/below the above-described reflective layer.

A pixel-defining layer 118 having an opening 118OP that exposes a central portion of the pixel electrode 211 may be on the pixel electrode 211. The pixel-defining layer 118 may include an organic insulating material and/or an inorganic insulating material. The opening 118OP may define an emission area of light emitted from the display element DE (hereinafter, referred to as an emission area EA). For example, the width of the opening 118OP may correspond to the width of the emission area EA of the display element DE.

In an embodiment, the pixel-defining layer 118 may include a light-blocking material, and may have a black color. The light-blocking material may include carbon black, carbon nanotubes, resin and/or paste including black dye, metal particles (e.g., Ni, Al, Mo, and/or an alloy thereof), metal oxide particles (e.g., chromium oxide), and/or metal nitride particles (e.g., chromium nitride). When the pixel-defining layer 118 includes the light-blocking material, external light reflection due to metal structures below the pixel-defining layer 118 may be reduced.

A spacer 119 may be on the pixel-defining layer 118. The spacer 119 may be provided to prevent or reduce damage to the substrate 100 in a method of manufacturing a display apparatus. A mask sheet may be used when manufacturing a display panel. In some embodiments when the mask sheet enters the opening 118OP of the pixel-defining layer 118 and/or is brought into close contact with the pixel-defining layer 118 to deposit a deposition material on the substrate 100, a defect in which a portion of the substrate 100 is damaged and/or broken by the mask sheet may be prevented (or an occurrence or likelihood of such defect may be reduced).

The spacer 119 may include an organic insulating material, such as polyimide. In some embodiments, the spacer 119 may include an inorganic insulating material, such as $SiN_x$ and/or $SiO_2$, or may include an organic insulating material and an inorganic insulating material.

In an embodiment, the spacer 119 may include a material different from that of the pixel-defining layer 118. In some embodiments, the spacer 119 may include the same material as that of the pixel-defining layer 118. In some embodiments, the pixel-defining layer 118 and the spacer 119 may be formed together in a mask process using a halftone mask and/or the like.

An intermediate layer 212 may be on the pixel-defining layer 118. The intermediate layer 212 may include an emission layer 212b in the opening 118OP of the pixel-defining layer 118. The emission layer 212b may include a polymer and/or low-molecular weight organic material that emits light of a set or certain color.

A first functional layer 212a and a second functional layer 212c may be below and on the emission layer 212b, respectively. The first functional layer 212a may include, for example, a hole transport layer (HTL), or an HTL and a hole injection layer (HIL). The second functional layer 212c is a component on the emission layer 212b and is optional. The second functional layer 212c may include an electron transport layer (ETL) and/or an electron injection layer (EIL). The first functional layer 212a and/or the second functional layer 212c may be a common layer formed to entirely cover the substrate 100, like a counter electrode 213 to be described below.

The counter electrode 213 may include a conductive material (e.g., an electrically conductive material) having a low work function. For example, the counter electrode 213 may include a (semi) transparent layer including Ag, Mg, Al, Pt, Pd, Au, Ni, Nd, Ir, Cr, lithium (Li), Ca, and/or an alloy thereof. In some embodiments, the counter electrode 213 may further include a layer including ITO, IZO, ZnO, and/or $In_2O_3$ on the (semi)transparent layer including the above-described material.

In some embodiments, a capping layer may further be on the counter electrode 213. The capping layer may include lithium fluoride (LiF), an inorganic material, and/or an organic material.

The encapsulation layer 300 may be on the counter electrode 213. In an embodiment, the encapsulation layer 300 may include at least one inorganic encapsulation layer and at least one organic encapsulation layer. FIG. 3 shows that the encapsulation layer 300 includes a first inorganic encapsulation layer 310, an organic encapsulation layer 320, and a second inorganic encapsulation layer 330 that are sequentially stacked.

The first inorganic encapsulation layer 310 and the second inorganic encapsulation layer 330 may each include one or more inorganic materials selected from among $Al_2O_3$, $TiO_2$, $Ta_2O_5$, $HfO_2$, $ZnO_x$, $SiO_2$, $SiN_x$, and SiON. The organic encapsulation layer 320 may include a polymer-based material. The polymer-based material may include acrylic resin, epoxy-based resin, polyimide, polyethylene (PE), and/or the like. In an embodiment, the organic encapsulation layer 320 may include acrylate.

In some embodiments, a touch sensor layer may be on the encapsulation layer 300. The touch sensor layer may obtain coordinate information based on an external input, for example, a touch event.

In some embodiments, an optical functional layer may be on the touch sensor layer. The optical functional layer may reduce reflectance of light (external light) incident toward a display apparatus from the outside, and/or may improve the color purity of light emitted from the display apparatus. In an embodiment, the optical functional layer may include a retarder and/or a polarizer. The retarder may be of a film type (or kind) or a liquid crystal coating type (or kind), and may include a λ/2 retarder and/or a λ/4 retarder. The polarizer may also be of a film type (or kind) or a liquid crystal coating type (or kind). The film type (or kind) may include a stretchable synthetic resin film, and the liquid crystal coating type (or kind) may include liquid crystals provided in a set or certain arrangement. The retarder and the polarizer may further include a protective film.

Figure 4A:
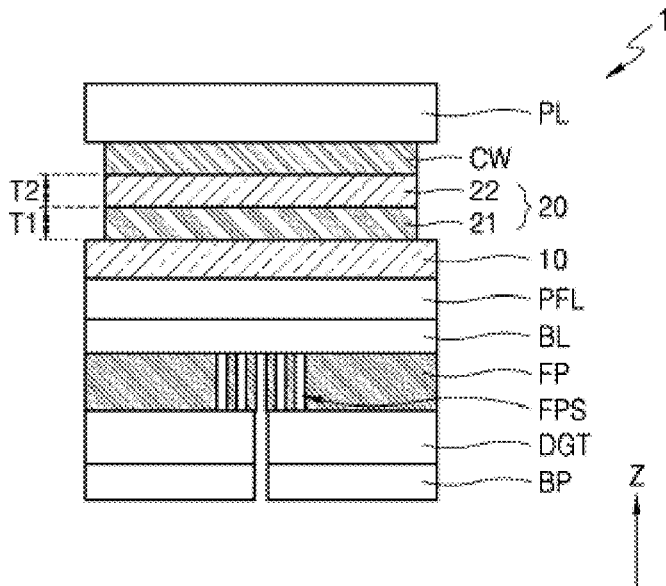
FIGS. 4A-4B are schematic cross-sectional views of a stacked structure of a display apparatus according to embodiments.
Figure 4B:
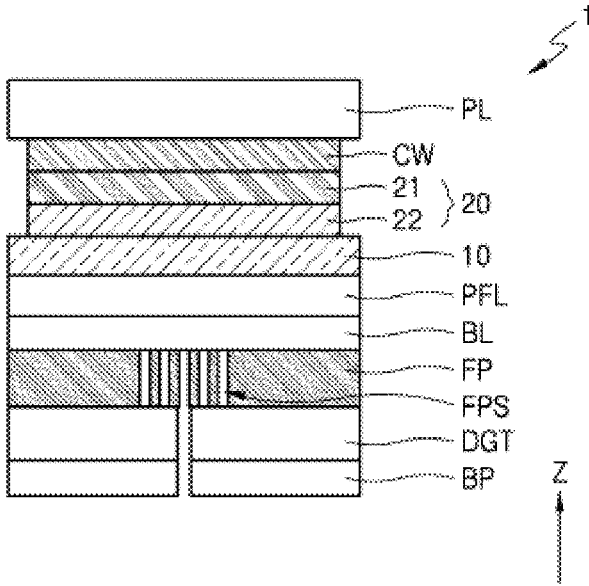

FIG. 4A is a schematic cross-sectional view of a stacked structure of the display apparatus 1 according to an embodiment. FIG. 4B is a schematic cross-sectional view of a stacked structure of the display apparatus 1 according to another embodiment. FIG. 4B shows an example in which the stacking order of a first adhesive layer 21 and a second adhesive layer 22 in the embodiment of FIG. 4A is changed.

Referring to FIG. 4A, the display apparatus 1 may include the display panel 10 and the cover window CW.

The display panel 10 may provide an image via the entire surface thereof. In some embodiments, a plurality of pixels PX (see FIG. 1) may be on the entire surface of the display panel 10 to form the display area DA.

The cover window CW may be on the display panel 10, and when a touch sensor layer and/or an optical functional layer is provided, the cover window CW may be on the touch sensor layer and/or the optical functional layer. The cover window CW may have high transmittance to transmit light emitted from the display panel 10. In some embodiments, the cover window CW may have high strength and hardness to protect the display apparatus 1 from an external impact. In an embodiment, the cover window CW may be a flexible window. The cover window CW may be easily bent according to an external force without generating cracks and/or the like, thereby protecting the display panel 10. The cover window CW may include at least one selected from glass, sapphire, and plastic. The cover window CW may include, for example, ultra-thin glass and/or colorless polyimide. In an embodiment, the cover window CW may have a structure in which a polymer layer having flexibility is on one surface of a glass substrate, or may include only a polymer layer.

The cover window CW may be attached to the display panel 10 by an adhesive member 20. The adhesive member 20 may be formed in the form of resin and then applied to an upper portion of the display panel 10. Because the adhesive member 20 is formed by applying resin, the adhesive member 20 may have a side surface that is inclined at an edge of the display apparatus 1. Although FIGS. 4A-4B show that the adhesive member 20 has a side surface perpendicular (e.g., substantially perpendicular) to an upper surface of the display panel 10, the disclosure is not limited thereto. The adhesive member 20 may have a side surface that is inclined from the upper surface of the display panel 10. For example, a first surface of the adhesive member 20, which is adjacent to the cover window CW, may have a smaller width than a second surface of the adhesive member 20, which is adjacent to the display panel 10.

The adhesive member 20 may include a first adhesive layer 21 and a second adhesive layer 22 on the first adhesive layer 21. The first adhesive layer 21 and the second adhesive layer 22 may be referred to as a first resin layer and a second resin layer, respectively. Although FIGS. 4A-4B show that the first adhesive layer 21 and the second adhesive layer 22 each have a side surface perpendicular (e.g., substantially perpendicular) to the upper surface of the display panel 10, the disclosure is not limited thereto. The first adhesive layer 21 and the second adhesive layer 22 may each have a side surface that is inclined from the upper surface of the display panel 10.

The first adhesive layer 21 may include a liquid optically clear resin (OCR). In an embodiment, the first adhesive layer 21 may be formed by an inkjet printing process. The first adhesive layer 21 may have a Young's Modulus less than that of the second adhesive layer 22. As used herein, a Young's modulus may refer to an elastic modulus. For example, the Young's modulus of the first adhesive layer 21 may be in a range of about 0.01 MPa to about 0.1 MPa. The first adhesive layer 21 may relieve stress that is applied when the display apparatus 1 is folded. In an embodiment, a thickness T1 of the first adhesive layer 21 may be greater than or equal to a thickness T2 of the second adhesive layer 22.

The second adhesive layer 22 may have a Young's modulus greater than that of the first adhesive layer 21. For example, the Young's modulus of the second adhesive layer 22 may be in a range of about 50 MPa to about 300 MPa. As the second adhesive layer 22 has a relatively high elastic modulus, the impact resistance of the display apparatus 1 may be improved.

The second adhesive layer 22 may include a resin composition including an acrylamide-based compound, an ester-based compound, an acrylate-based compound, and an initiator. The second adhesive layer 22 may include the resin composition and a surfactant.

The acrylamide-based compound may be a main monomer constituting a polymer chain of the resin composition constituting the second adhesive layer 22. The acrylamide-based compound may increase the adhesive force of the resin composition. The acrylamide-based compound may include, for example, N,N-dimethylacrylamide.

The acrylamide-based compound may have a weight ratio in a range of about 20 wt % to about 30 wt % with respect to the resin composition (e.g., with respect to a total weight of the resin composition). When the weight ratio of the acrylamide-based compound is less than 20 wt %, the adhesive force of the resin composition may be excessively reduced. When the weight ratio of the acrylamide-based compound is greater than 30 wt %, issues in storage stability and reliability may occur.

The ester-based compound may include a first ester-based compound and a second ester-based compound that are different from each other. The first ester-based compound and the second ester-based compound may include a polar compound. By including the ester-based compound, the resin composition may have high adhesive force and elasticity.

The first ester-based compound may include a heterocycloalkyl group. For example, the first ester-based compound may include 2-propenoic acid, (5-ethyl-1,3-dioxan-5-yl) methyl ester and/or the like. 2-propenoic acid, (5-ethyl-1,3-dioxan-5-yl)methyl ester may be referred to as (5-ethyl-1, 3-dioxan-5-yl)methyl prop-2-enoate or (5-ethyl-1,3-dioxan-5-yl)methyl acrylate. The first ester-based compound may have a weight ratio in a range of about 15 wt % to about 25 wt % with respect to the resin composition (e.g., with respect to the total weight of the resin composition).

The second ester-based compound may include an aryl group. For example, the second ester-based compound may include 2-propenoic acid, 2-phenoxyethyl ester and/or the like. 2-propenoic acid, 2-phenoxyethyl ester may be referred to as 2-phenoxyethyl acrylate, 2-phenoxyethyl prop-2-enoate, or ethylene glycol phenyl ether acrylate. The second ester-based compound may have a weight ratio in a range of about 25 wt % to about 35 wt % with respect to the resin composition (e.g., with respect to the total weight of the resin composition).

The acrylate-based compound may include a urethane acrylate-based compound, a first acrylate-based compound, and a second acrylate-based compound. The first acrylate-based compound and the second acrylate-based compound may include different materials.

The urethane acrylate-based compound may be a urethane acrylate-based monomer and/or an oligomer obtained by polymerization of a urethane acrylate-based monomer. The urethane acrylate-based compound may be cured by a radical according to a photoinitiator to form a polymer. The urethane acrylate-based compound may have a weight ratio in a range of about 10 wt % to about 20 wt % with respect to the resin composition (e.g., with respect to the total weight of the resin composition). When the weight ratio of the urethane acrylate-based compound is less than 10 wt %, it may be difficult to form a polymer through a curing reaction. When the weight ratio of the urethane acrylate-based compound is greater than 20 wt %, the resin composition may have increased non-polarity, thereby having reduced cleanability to ethanol.

The first acrylate-based compound may be a bicyclic compound. The first acrylate-based compound may have a double ring structure. The first acrylate-based compound may be a bridged bicyclic compound. The first acrylate-based compound may include, for example, exo-1,7,7-trimethylbicyclo[2.2.1]hept-2-yl acrylate and/or the like. The first acrylate-based compound may have a weight ratio in a range of about 10 wt % to about 20 wt % with respect to the resin composition (e.g., with respect to the total weight of the resin composition).

The second acrylate-based compound may include a linear alkyl group. For example, the second acrylate-based compound may include, for example, isooctyl acrylate and/or the like. The second acrylate-based compound may have a weight ratio in a range of about 5 wt % to about 15 wt % with respect to the resin composition (e.g., with respect to the total weight of the resin composition).

By including the first acrylate-based compound having a bicyclic structure compound, the resin composition may be rigid. By including the second acrylate-based compound having a linear structure, the resin composition may be flexible. The resin composition may be rigid and tough. Accordingly, the second adhesive layer 22 may improve the impact resistance of the display apparatus 1.

The initiator may include a phosphorus-based compound. For example, the initiator may include a phosphinate-based compound. For example, the initiator may include ethyl phenyl(2,4,6-trimethylbenzoyl)phosphinate and/or the like. The initiator may have a weight ratio in a range of about 0.01 wt % to about 5 wt % with respect to the resin composition (e.g., with respect to the total weight of the resin composition).

The second adhesive layer 22 may further include a non-silicone-based surfactant. The non-silicone-based surfactant may include, for example, Triton™ X-100 (TX-10), cetrimonium bromide (CTAB), sodium dodecylbenzene sulfonate (SDBS), sodium dodecyl sulfate (SDS), sodium 2-ethylhexyl sulfate, and/or the like. When the non-silicone-based surfactant is added, the wettability between the first adhesive layer 21 and the second adhesive layer 22 may be improved.

The thickness T2 of the second adhesive layer 22 may be less than or equal to the thickness T1 of the first adhesive layer 21. For example, the thickness T2 of the second adhesive layer 22 may be in a range of about 30 μm to about 50 μm. When the thickness T2 of the second adhesive layer 22 is greater than 50 μm, cracks may occur when the display apparatus 1 is folded. When the thickness T2 of the second adhesive layer 22 is less than 30 μm, the impact resistance of the display apparatus 1 may be reduced.

In an embodiment, as shown in FIG. 4A, the first adhesive layer 21 may be between the display panel 10 and the second adhesive layer 22. In some embodiments, as shown in the embodiment of FIG. 4A, the first adhesive layer 21 may be below the second adhesive layer 22. In another embodiment, as shown in FIG. 4B, the second adhesive layer 22 may be between the display panel 10 and the first adhesive layer 21. In some embodiments, as shown in the embodiment of FIG. 4B, the first adhesive layer 21 may be on the second adhesive layer 22.

In an embodiment, the display apparatus 1 may further include an outer protective layer PL on the cover window CW. The outer protective layer PL may entirely cover the upper surface of the cover window CW. The outer protective layer PL may absorb an external impact and prevent or reduce scratching of the cover window CW. The outer protective layer PL may include, for example, polymer resin, such as polyimide and/or PE, and/or a urethane-based material.

In an embodiment, the display apparatus 1 may further include a protective film PFL, a barrier layer BL, a foldable plate FP, a digitizer DGT, and a base plate BP.

The protective film PFL may be on a rear surface of the display panel 10. The protective film PFL may include a plastic film as a base layer. The protective film PFL may include a plastic film including thermoplastic resin, for example, any one selected from among PET, PE, polyvinyl chloride (PVC), polypropylene (PP), PS, polyacrylonitrile (PAN), styrene-acrylonitrile copolymer (SAN), acrylonitrile-butadiene-styrene (ABS), PMMA, and a combination thereof. A material constituting the protective film PFL is not limited to plastic resin, and may include an organic/inorganic composite material. The protective film PFL may include a porous organic layer and an inorganic material filled in pores of the organic layer.

The barrier layer BL may be below the protective film PFL. The barrier layer BL may increase resistance against compressive force due to external pressure. The barrier layer BL may prevent or reduce the display panel 10 from being deformed. The barrier layer BL may include a flexible plastic material, such as polyimide and/or PET. The barrier layer BL may absorb light incident from the outside. The barrier layer BL may be a colored film having low light transmittance. For example, the barrier layer BL may be a black plastic film. When the display apparatus 1 is viewed from above the cover window CW, components below the barrier layer BL may not be visible to a user.

The foldable plate FP may be below the barrier layer BL. The foldable plate FP may support components above the foldable plate FP. The foldable plate FP may be folded together with the display panel 10. The foldable plate FP may include a folding structure FPS of which the shape and/or length changes when the display apparatus 1 is folded. The folding structure FPS may include a concave-convex shape having a plurality of through grooves, links pivotally connected to each other, and/or the like. Both sides of the foldable plate FP may be symmetrical about the folding structure FPS.

The foldable plate FP may include a material capable of transmitting a magnetic field generated by the digitizer DGT to be described below without loss, with minimal loss, or with reduced loss. In an embodiment, the foldable plate FP may include a non-metal material. For example, the foldable plate FP may include plastic, glass fiber reinforced plastic, and/or glass. For example, the foldable plate FP may include carbon fiber reinforced plastic (CFRP). In the display apparatus 1 according to an embodiment, the digitizer DGT may be omitted, and the foldable plate FP may include a metal material.

The digitizer DGT may be below the foldable plate FP. The digitizer DGT may include a first portion and a second portion that are spaced apart from each other with a set or certain gap therebetween. The digitizer DGT may be referred to as an electromagnetic radiation (EMR) sensing panel. In some embodiments, the digitizer DGT may be omitted.

The base plate BP may be below the digitizer DGT. The base plate BP may include a first base plate portion and a second base plate portion that are spaced apart from each other. The base plate BP may support the display panel 10 and impart rigidity to the display apparatus 1. In an embodiment, the base plate BP may include a metal material. For example, the base plate BP may include a metal material, such as Cu, Ni, Ag, Al, Mg, and/or Ti. In an embodiment, the base plate BP may include carbon steel, and/or alloy steel such as stainless steel.

In some embodiments, a third adhesive layer may be between the cover window CW and the adhesive member 20, between the display panel 10 and the protective film PFL, between the protective film PFL and the barrier layer BL, between the barrier layer BL and the foldable plate FP, between the digitizer DGT and the foldable plate FP, and between the digitizer DGT and the base plate BP. The third adhesive layer may include, for example, a pressure sensitive adhesive (PSA) and/or an optically clear adhesive (OCA).

Figure 5:
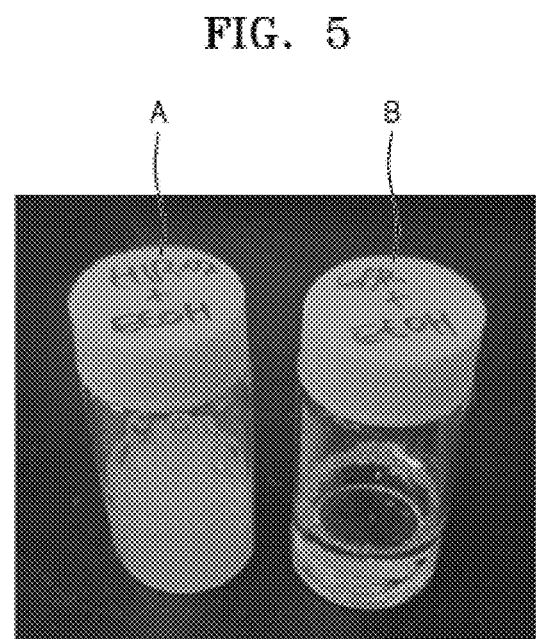
FIG. 5 shows experimental results regarding compatibility between a resin composition and ethanol, according to an embodiment and a comparative example.
Figure 6:
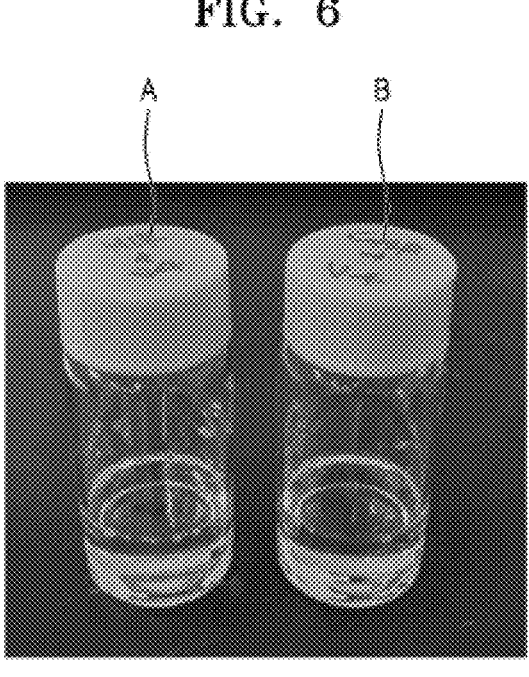
FIG. 6 shows experimental results regarding compatibility between a resin composition and an optically clear resin (OCR), according to an embodiment and a comparative example.
Figure 7:
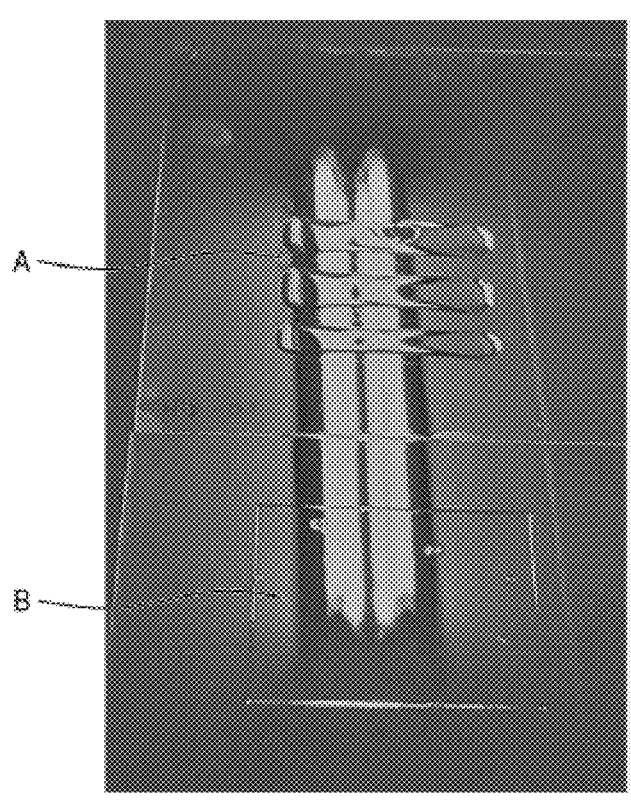
FIG. 7 shows experimental results regarding wettability between a resin composition and an OCR, according to an embodiment and a comparative example.

FIG. 5 shows experimental results regarding compatibility between a resin composition and ethanol, according to an embodiment and a comparative example. FIG. 6 shows experimental results regarding compatibility between a resin composition and OCR, according to an embodiment and a comparative example. FIG. 7 shows experimental results regarding wettability between a resin composition and OCR when different surfactants are added to the resin composition, according to an embodiment of and a comparative example.

In FIGS. 5-7, 'A' represents experimental results according to a comparative example, and 'B' represents experimental results according to an embodiment.

A resin composition according to Comparative Example 'A' includes N,N-dimethylacrylamide, 2-propenoic acid, isodecyl ester, and a urethane acrylate-based compound, and includes phenylbis(2,4,6-trimethylbenzoyl)phosphine oxide as an initiator. In more detail, the resin composition according to Comparative Example 'A' includes 40 wt % of N,N-dimethylacrylamide, 31 wt % of 2-propenoic acid, isodecyl ester, 27 wt % of the urethane acrylate-based compound, and 2 wt % of phenylbis(2,4,6-trimethylbenzoyl) phosphine oxide. 2-propenoic acid, isodecyl ester may be referred to as isodecyl acrylate, 8-methylnonyl acrylate, or 8-methylnonyl prop-2-enoate.

A resin composition according to Example 'B' includes N,N-dimethylacrylamide, 2-propenoic acid, (5-ethyl-1,3-dioxan-5-yl)methyl ester, 2-propenoic acid, 2-phenoxyethyl ester, a urethane acrylate-based compound, exo-1,7,7-trimethylbicyclo[2.2.1]hept-2-yl acrylate, and isooctyl acrylate, and includes ethyl phenyl(2,4,6-trimethylbenzoyl)phosphinate as an initiator. In more detail, the resin composition according to Example 'B' includes 25 wt % of N,N-dimethylacrylamide, 16 wt % of 2-propenoic acid, (5-ethyl-1, 3-dioxan-5-yl)methyl ester, 26 wt % of 2-propenoic acid, 2-phenoxyethyl ester, 12 wt % of the urethane acrylate-based compound, 12 wt % of exo-1,7,7-trimethylbicyclo [2.2.1]hept-2-yl acrylate, 8 wt % of isooctyl acrylate, and 1 wt % of ethyl phenyl(2,4,6-trimethylbenzoyl)phosphinate.

By including 2-propenoic acid, isodecyl ester, which is a non-polar ester-based compound, and including a greater amount of the non-polar urethane acrylate-based compound than the resin composition of Example 'B', the resin composition of Comparative Example 'A' is relatively non-polar.

In contrast, by including 2-propenoic acid, (5-ethyl-1,3-dioxan-5-yl)methyl ester and 2-propenoic acid, 2-phenoxyethyl ester, which are polar ester-based compounds, and including a relatively small amount of the urethane acrylate-based compound in a range of 10 wt % to 20 wt %, the resin composition of Example 'B' is relatively polar.

By including ethyl phenyl(2,4,6-trimethylbenzoyl)phosphinate as an initiator, the resin composition of Example 'B' may have improved reliability compared to the resin composition of Comparative Example 'A' including phenylbis (2,4,6-trimethylbenzoyl)phosphine oxide as an initiator.

Referring to FIG. 5, it can be seen that a precipitation reaction occurs when the resin composition of Comparative Example 'A' is mixed together with ethanol. In contrast, it can be seen that the resin composition of Example 'B' does not undergo a precipitation reaction even when mixed together with ethanol, and the resin composition of 'B' is dissolved in ethanol. Because the solubility of the resin composition according to an embodiment in ethanol is improved, the cleaning force of ethanol for the resin composition remaining inside process equipment may be improved.

Referring to FIG. 6, it can be seen that each of the resin composition of Comparative Example 'A' and the resin composition of Example 'B' is dissolved without a precipitation reaction when mixed together with an OCR formed by an inkjet process. Accordingly, when forming the first adhesive layer 21 and the second adhesive layer 22 described with reference to FIGS. 4A-4B, the OCR of the first adhesive layer 21 and the resin composition of the second adhesive layer 22 according to an embodiment may be sequentially ejected from one equipment head without issues.

FIG. 7 shows experimental results regarding wettability between a resin composition and an OCR when different surfactants are added to the resin composition. Referring to FIG. 7, embodiments in which the OCR is applied on the resin composition of Comparative Example 'A' and the OCR is applied on the resin composition of Example 'B' are shown. It can be seen that when a silicone-based surfactant is added to the resin composition of Comparative Example 'A', dewetting of the applied OCR occurs. In contrast, it can be seen that when a non-silicone-based surfactant is added to the resin composition of Example 'B', the applied OCR forms a surface without dewetting. Accordingly, when the second adhesive layer 22 (see FIG. 4A) is formed by adding a non-silicone-based surfactant to the resin composition according to an embodiment, the second adhesive layer 22 may have improved wettability with the first adhesive layer 21 including the OCR.

According to the one or more embodiments, a resin composition having improved cleanability to ethanol and a display apparatus including the resin composition may be provided. According to the one or more embodiments, a resin composition having improved wettability with an OCR and a display apparatus including the resin composition may be provided. However, the scope of the disclosure is not limited by these effects.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims, and equivalents thereof.

What is claimed is:

1. A display apparatus comprising:
a display panel having a display element therein;
a cover window on the display panel; and
an adhesive member between the display panel and the cover window and comprising a first adhesive layer and a second adhesive layer on the first adhesive layer,
wherein the second adhesive layer comprises a resin composition comprising an acrylamide-based compound, an ester-based compound, an acrylate-based compound, and an initiator, the ester-based compound comprises a first ester-based compound and a second ester-based compound, the first ester-based compound comprising a heterocycloalkyl group, and the second ester-based compound comprising an aryl group, and the acrylate-based compound comprises a urethane acrylate-based compound, a first acrylate-based compound, and a second acrylate-based compound, the first acrylate-based compound comprising a bicyclic compound, and the second acrylate-based compound comprising a linear alkyl group.

2. The display apparatus of claim 1, wherein the acrylamide-based compound is included at a weight ratio in a range of about 20 wt % to about 30 wt % with respect to the resin composition, the first ester-based compound is included at a weight ratio in a range of about 15 wt % to about 25 wt % with respect to the resin composition, the second ester-based compound is included at a weight ratio in a range of about 25 wt % to about 35 wt % with respect to the resin composition, the urethane acrylate-based compound is included at a weight ratio in a range of about 10 wt % to about 20 wt % with respect to the resin composition, the first acrylate-based compound is included at a weight ratio in a range of about 10 wt % to about 20 wt % with respect to the resin composition, the second acrylate-based compound is included at a weight ratio in a range of about 5 wt % to about 15 wt % with respect to the resin composition, and the initiator is included at a weight ratio in a range of about 0.01 wt % to about 5 wt % with respect to the resin composition.

3. The display apparatus of claim 1, wherein the second adhesive layer further comprises a non-silicone-based surfactant.

4. The display apparatus of claim 1, wherein a Young's modulus of the first adhesive layer is less than a Young's modulus of the second adhesive layer.

5. The display apparatus of claim 1, wherein the first acrylate-based compound comprises a bridged bicyclic compound.

6. The display apparatus of claim 1, wherein the acrylamide-based compound comprises N,N-dimethylacrylamide.

7. The display apparatus of claim 1, wherein the first ester-based compound comprises 2-propenoic acid, (5-ethyl-1,3-dioxan-5-yl)methyl ester.

8. The display apparatus of claim 1, wherein the second ester-based compound comprises 2-propenoic acid, 2-phenoxyethyl ester.

9. The display apparatus of claim 1, wherein the first acrylate-based compound comprises exo-1,7,7-trimethylbicyclo[2.2.1]hept-2-yl acrylate.

10. The display apparatus of claim 1, wherein the second acrylate-based compound comprises isooctyl acrylate.

11. The display apparatus of claim 1, wherein the initiator comprises a phosphorus-based compound.

12. The display apparatus of claim 11, wherein the initiator comprises ethyl phenyl(2,4,6-trimethylbenzoyl)phosphinate.

13. A portable electronic device comprising:

A foldable display panel comprising a first display area and a second display area;

a cover window on the foldable display panel; and an adhesive member between the foldable display panel and the cover window and comprising a first adhesive layer and a second adhesive layer on the first adhesive layer, wherein the second adhesive layer comprises a resin composition comprising an acrylamide-based compound, an ester-based compound, an acrylate-based compound, and an initiator, the ester-based compound comprises a first ester-based compound and a second ester-based compound, the first ester-based compound comprising a heterocycloalkyl group, and the second ester-based compound comprising an aryl group, and the acrylate-based compound comprises a urethane acrylate-based compound, a first acrylate-based compound, and a second acrylate-based compound, the first acrylate-based compound comprising a bicyclic compound, and the second acrylate-based compound comprising a linear alkyl group.

14. The portable electronic device of claim 13, wherein a thickness of the second adhesive layer is less than or equal to a thickness of the first adhesive layer.

* * * * *